Nov. 24, 1964
H. J. COHN
3,158,084
COFFEE MAKER
Filed April 8, 1963
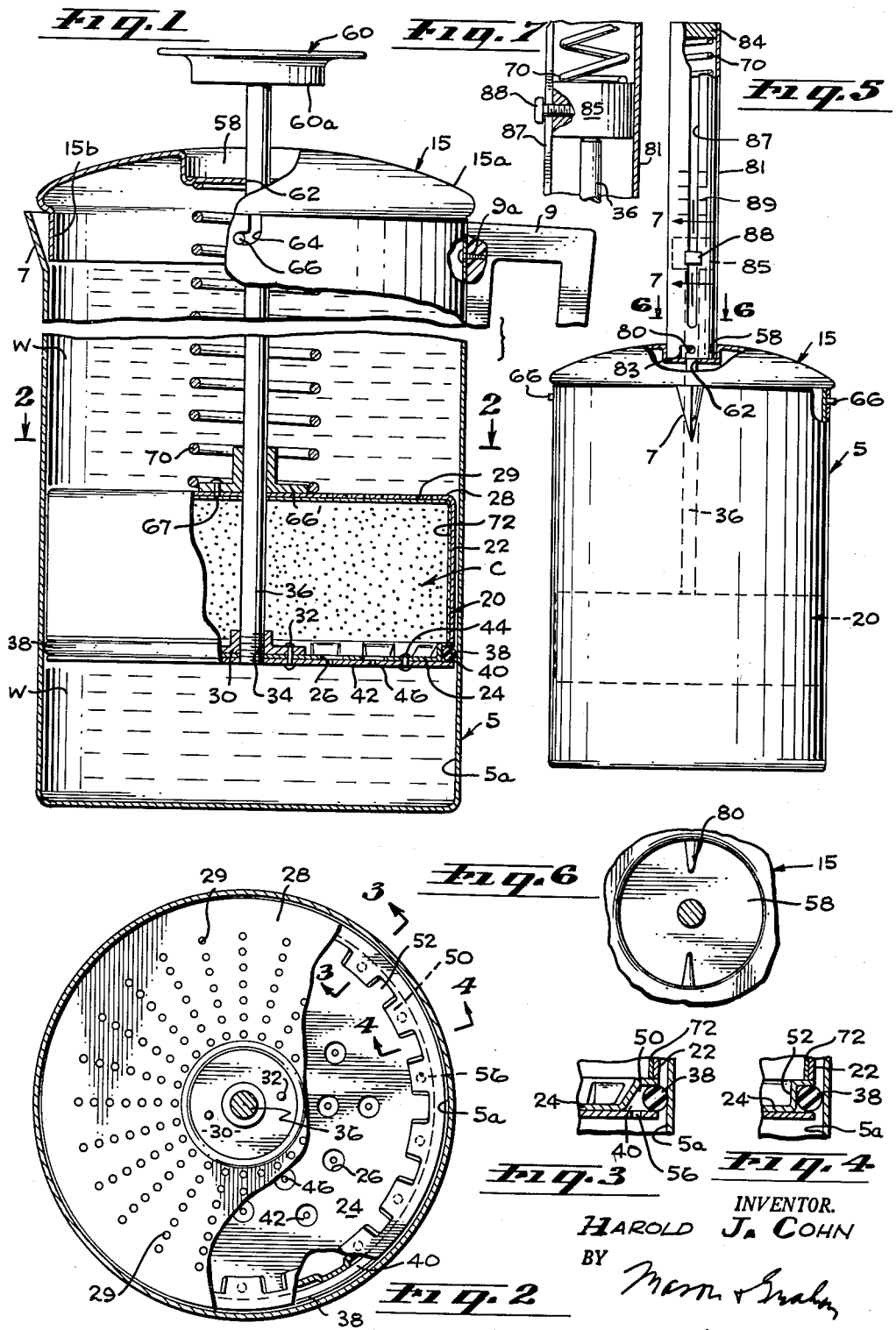
INVENTOR.
HAROLD J. COHN
BY
ATTORNEYS

United States Patent Office 3,158,084
Patented Nov. 24, 1964

3,158,084
COFFEE MAKER
Harold J. Cohn, 826 Tigertail Road, Los Angeles, Calif.
Filed Apr. 8, 1963, Ser. No. 271,145
7 Claims. (Cl. 99—297)

This invention has to do with coffee makers. In its more particular aspects, the invention relates to a coffee making device wherein the coffee is produced by hydraulically forcing water through a perforated plunger containing the ground coffee.

Among the advantages of this coffee maker over the "drip" or "percolator" type, in which the water gravitates through the ground coffee, are that the quality of the coffee produced is much better since the water is not exposed to the coffee grounds long enough to pick up the objectionable protective oils in the coffee grounds, and the water used in my device can be considerably below the boiling point, thus preventing the water from melting the objectionable oils in the coffee grounds. Also, by the use of my coffee maker, it is possible to produce the coffee much quicker than is possible with the conventional coffee makers.

While coffee makers of the hydraulic type have been proposed, it has been my observation that, within the cost range permissible for producing and marketing coffee makers at prices making them generally practical for home ues, great difficulty has been experienced in preventing leakage of water between the plunger and the inside surface of the pot, with the result that the desired strength of coffee produced is not obtained, and it is not at all uniform. It is therefore one of the objects of my invention to provide a construction which, although it may be economically produced, eliminates the leakage problems.

Another object is to provide an improved coffee maker construction which is simple to operate, which enables coffee of excellent quality to be made very quickly, and which coffee maker has substantial durability.

My invention has stilll further objects and advantages which will become apparent from the following detailed description of presently preferred embodiments thereof, for which purpose I shall refer to the accompanying drawing wherein:

FIG. 1 is a view partly in longitudinal section and partly in side elevation showing a preferred embodiment of my invention;

FIG. 2 is a section taken on line 2—2 of FIG. 1 but with portions of the structure broken away;

FIGS. 3 and 4 are enlarged fragmentary sections taken respectively on lines 3—3 and 4—4 of FIG. 2;

FIG. 5 is a side elevation, shown partly in section, of a modified form of my invention;

FIG. 6 is a section taken on line 6—6 of FIG. 5; and

FIG. 7 is an enlarged detail fragmentary sectional view on line 7—7 of FIG. 5.

Referring now to the drawing, I show a pot or receptacle 5 which has a cylindrical inner surface 5a, except for the spout portion 7. A handle 9 is attached to the pot in any suitable manner, as by screws 9a.

A cover lid 15 has a dome-shaped top portion 15a and a cylindrical depending flanged portion 15b which snugly fits in the top end of the pot 5.

For reciprocal movement in the pot, I provide a plunger 20, which will now be described.

The plunger 20 has a cylindrical side wall 22 of slightly smaller outside diameter than the inside diameter of the side wall 5a of the pot, a bottom wall 24 provided with perforations 26, and has a top wall 28 provided with perforations 29 of the order of about ½₂" in diameter. The bottom wall 24 is not formed integral with the side wall 22 so that it may be detached from the plunger as will hereinafter be pointed out.

A flanged plunger attaching plate 30 is secured to the bottom wall 24, as by rivets 32, said plate having a threaded bore 34 to receive the threaded bottom end portion of the plunger rod 36.

To provide for the mounting of a resilient, rubber-like O-ring 38 to provide a seal between the plunger and the inside surface of the pot, the bottom wall 24 is formed to provide an annular, radially opening recess 40, in which the O-ring is mounted and exposed for sealing engagement with the inner surface of the side wall of the pot.

To retain the O-ring against vertical escape from the recess, I provide a bottom cover plate 42 for the plunger, which is secured against the bottom wall 24 as by rivets 44 and rivets 32, said bottom cover plate having its marginal portion underlying the recess 40. Small perforations 46 are provided through the bottom cover plate 42 in communication with the respective relatively larger diameter perforations 26. The perforations 46 are preferably of the order of about ½₂" in diameter, and since they communicate with the relatively larger diameter perforations 26, they have a length only corresponding to the thickness of the bottom cover plate and thereby are not long enough to be apt to become clogged.

An important feature of my invention resides in the construction which I shall now describe for applying fluid pressure against the inner surface of the O-ring to force said ring into sealing engagement with the inner surface of the side wall of the pot.

This construction comprises circumferentially spaced, radially opening pockets 50, provided between the circumferentially spaced embossed portions 52 of the bottom wall 24. Communicating with the respective pockets 50, behind the portion of the O-ring exposed therein, I provide, in the marginal portion of the bottom cover plate 42, circumferentially spaced perforations 56 (FIG. 3), which perforations are relatively larger in diameter than the perforations 46. Thus, as the plunger 20 is forced downwardly against the water, in the manner hereinafter described, some of the water W in the pot beneath the plunger, will enter the pockets, through perforations 56, to force the O-ring radially outwardly into sealing engagement with the side wall of the pot, although the water entering the pockets may not escape upwardly between the plunger and the side wall of the pot.

In the embodiment as best shown in FIG. 1, the cover lid 15 is centrally embossed to provide an upwardly opening recess 58 to receive the reduced diameter portion 60a of the knob 60, threaded onto the top end of the plunger rod 36. When the plunger is in its downmost position in the pot, the upper end portion of the plunger rod slideably projects through an axial opening 62 in said recess.

In the top edge portion of the side wall 5a of the pot, I provide diametrically opposite bayonet slots 64 in which radial projections 66, carried by the flanged portion 15b of the cover lid, engage when it is desired to lock the cover lid on the pot.

A flanged plate 66' is secured to the top wall 28 of the plunger as by rivets 67. A compression spring 70 surrounds the plunger rod and bears at its bottom end against the plate 66' and bears at its top end against the recessed portion of the cover lid.

It is also my preference to mount a conventional filter paper or cloth 72 inside the plunger against the inner ends of the perforations 29.

In using my device to make coffee, the cover lid and plunger are removed from the pot, inverted, and the bottom wall 24 and bottom cover plate 42 are removed as a unit by unscrewing the threaded bottom end of the plunger rod from the bore 34 of plate 30, after which the ground coffee C is deposited in the plunger and the bottom wall 24 and plate 42 are reinstalled. Water is then introduced into the pot to the desired level, after which the user inserts the plunger into the pot against the top surface of the water and presses downwardly on the top cover lid to compress the spring 70. Then the projections 66 are engaged in the bayonet slots 64 to lock the cover lid on the body thus maintaining the spring in compression. As long as the spring is in compression, the plunger rod will project from the top of the cover lid as the plunger moves downwardly, to visually indicate the extent to which the plunger has moved downwardly in the pot under the influence of the spring.

The pressure exerted on the plunger by the spring will cause water in the bottom of the pot to be forced upwardly through the perforations 46, 26, through the coffee grounds in the plunger, through the filter cloth or paper 72, and finally through the perforations 29. Preferably, the filter should be of metal filter cloth. When the spring small have forced the plunger downwardly against the bottom of the pot, the coffee will have been made and will be above the plunger so that it may be poured from the pot through the spout 7.

In FIGS. 5 and 6, I show a modified form of my invention, in which the construction and parts are as before described and are given like reference numerals, except as will now be pointed out.

In this embodiment, the knob 60 is eliminated, and, extending through the embossed portion of the cover lid 15 into the recess 58, are a pair of diametrically opposed pins 80; and, instead of mounting the spring 70 between the cover lid and the plunger 20, I provide a tubular member 81 which is open at its bottom end and has opposed bayonet slots 83 in its bottom end portion, so that when the bottom end of the member 81 is inserted in the recess 58, and rotated, the pins 80 become engaged in the slots 83 to lockably secure the member 81 to the cover lid.

The compression spring 70 is mounted in the member 81, bearing at its top end against the top end wall 84 of said member, and carrying a second plunger 85 at its bottom end. The plunger rod 36 extends through the opening 62 in the cover lid and its top end is maintained in abutting engagement with the second plunger 85 by the pressure of the spring and the resistance to downward movement of the plunger 20 offered by the water.

A longitudinal slot 87 is provided in the side wall of the member 81, and an indicator element 88, which is preferably a threaded screw extending through the slot and threaded into the second plunger, moves along the slot in consonance with movement of the plunger 20 in the pot. Calibrations 89 are provided on the exterior of the member 81, along the slot, to enable the user to visibly observe the extent to which the plunger 20 is moved downwardly in the pot by the spring 70.

In both the foregoing described forms of my invention it will be observed that while during downward movement of the plunger in the receptacle under pressure, water under pressure is forced into the peripheral groove behind the elastomeric seal ring therein whereby to maintain an effective seal between the plunger and the inner surface of the side wall of the receptacle; when said plunger is being manually pulled upwardly in the receptacle to remove it therefrom the water behind the seal ring will drain back nito the bottom of the receptacle through the openings 56 to relieve any pressure behind the seal ring and thereby render it easy to withdraw the plunger.

I claim:

1. A device for making coffee comprising a cylindrical receptacle adapted to contain a charge of water to be used in making coffee, a hollow cylindrical plunger reciprocally mounted in said receptacle and having perforations in its top and bottom, and means cooperating with said plunger constantly to force it downwardly in said receptacle, said pluger having a radially opening annular peripheral recess and having portions defining circumferentially spaced pockets opening into said recess, an elastomeric seal ring disposed in said recess and having its inner surface exposed to said pockets; said plunger having circumferentially spaced water-passing openings in its bottom marginal portion communicating with said respective pockets.

2. The device set forth in claim 1 in which the means cooperating with said plunger constantly to force it downwardly in said receptacle comprises a coil compression spring seated against the top of the plunger and interposed between it and a detachable cover on the container.

3. A device for making coffee, comprising an open-topped cylindrical receptacle adapted to contain a charge of water to be used in making coffee, a cover for said receptacle, a hollow cylindrical plunger reciprocally mounted in said receptacle and adapted to contain ground coffee, said plunger having perforations in its top and bottom and having a radially opening annular peripheral recess in its bottom end portion, an elastomeric O-ring mounted in said recess and disposed for sealing engagement against the inner surface of said receptacle, said plunger having bottom water-passing openings communicating with said recess behind the inner surface of said O-ring, spring means within said container for applying downward pressure on said plunger whereby to force it downwardly in said water and to force water under pressure into said recess behind said ring; said latter pressure being relieved during any movement of said plunger upwardly in said receptacle.

4. A device for making coffee, comprising an open-topped cylindrical receptacle adapted to contain a charge of water to be used in making coffee, a cover removably mounted in closing relationship to the open top of said receptacle, means associated with said cover and said receptacle for releasably locking said cover to said receptacle, a hollow cylindrical plunger reciprocally mounted in said receptacle, said plunger having top and bottom perforations, a plunger rod secured at its bottom end to said plunger and having its top end portion slideably extending through said cover, a coil compression spring surrounding said plunger rod and interposed between said cover and said plunger to force said plunger downwardly against the water therein; said plunger having a radially opening, annular peripheral recess, and an elastomeric O-ring mounted in said recess and disposed for sealing engagement with the inner surface of said receptacle, and having openings in its bottom for passing water under pressure from beneath said plunger to said recess behind the inner surface of said ring whereby to force said ring into sealing engagement with the inner surface of said receptacle.

5. A device for making coffee, comprising an open topped cylindrical receptacle adapted to contain a charge of water to be used in making coffee, a cover carried by the open top end of said receptacle, means for releasably securing said cover to said receptacle, said cover having an axial opening therethrough, a hollow first cylindrical plunger reciprocally mounted in said receptacle and adapted to contain ground coffee, said plunger having perforated top and bottom walls, a seal ring carried by said plunger and interposed between said plunger and the inner surface of said receptacle, a tubular member detachably secured to said cover coaxial with said opening and extending above said cover, a second plunger reciprocally mounted in said tubular member, a rod secured at its bottom end to said first plunger, said rod reciprocally extending through said opening into engagement with said second plunger, and a compression spring mounted in said tubular member and exerting resilient downward pressure on said second plunger.

6. The device of claim 5 wherein said tubular member has a longitudinal slot and which additionally includes an indicator element secured to said second plunger and movable along said slot in consonance with movement of said first named plunger in said receptacle.

7. A device for making coffee comprising an open-topped cylindrical receptacle adapted to contain a charge of water to be used in making coffee, a hollow cylindrical plunger adapted to contain ground coffee received in said receptacle for movement axially thereof and having perforations in its top and bottom, a seal ring carried by said plunger and interposed between said plunger and the inner surface of said receptacle, a detachable cover for said container having a rod-passing opening, a plunger rod attached to said plunger and extending thereabove and slideably through said opening in the cover, a handle on the outer end of said rod, and a compression spring between said cover and said plunger for forcing said plunger downwardly through the water in the container.

References Cited in the file of this patent

UNITED STATES PATENTS

| | | |
|---|---|---|
| 2,614,793 | Storm | Oct. 21, 1952 |
| 2,732,268 | Duval | Jan. 24, 1956 |

FOREIGN PATENTS

| | | |
|---|---|---|
| 468,687 | Italy | Jan. 29, 1952 |
| 542,718 | Italy | May 3, 1956 |